Patented Nov. 20, 1928.

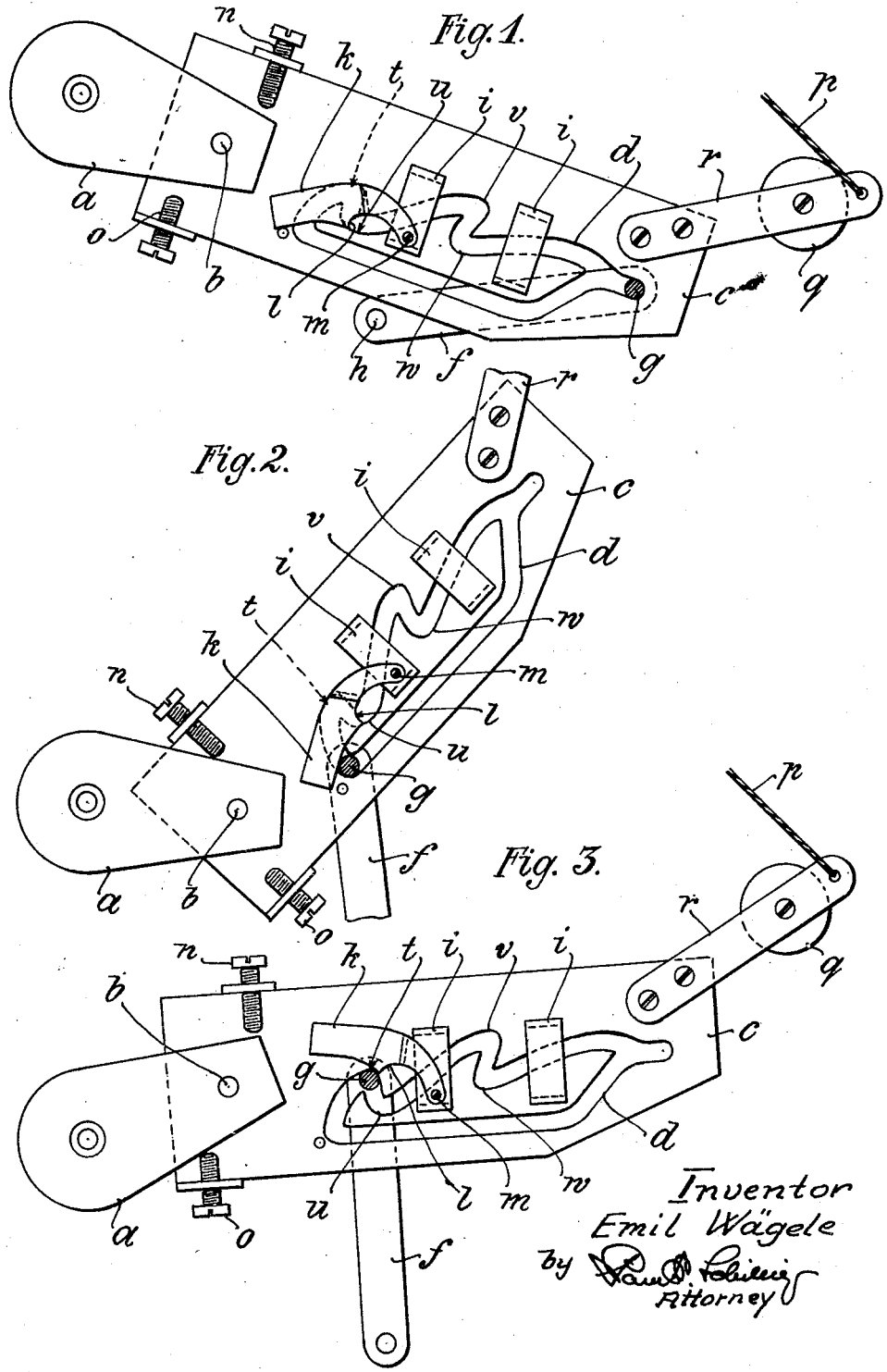

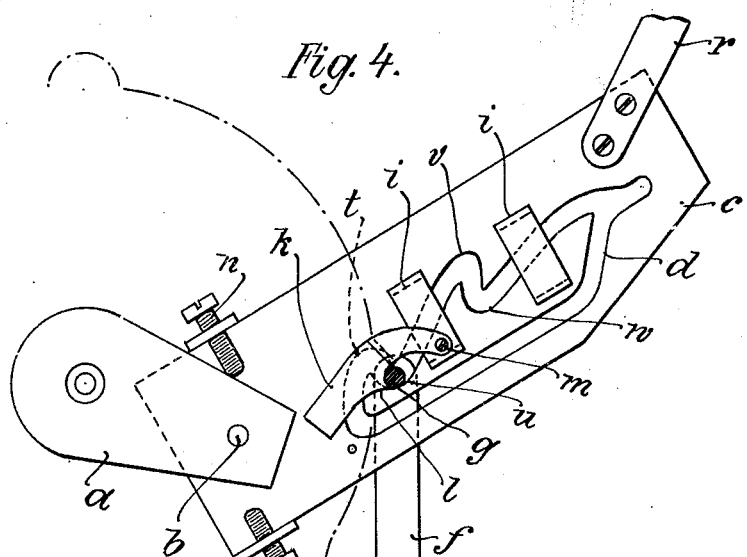
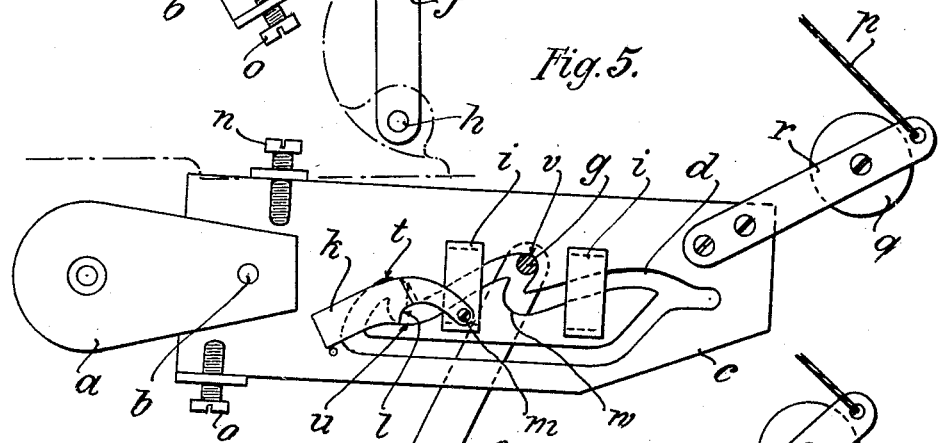
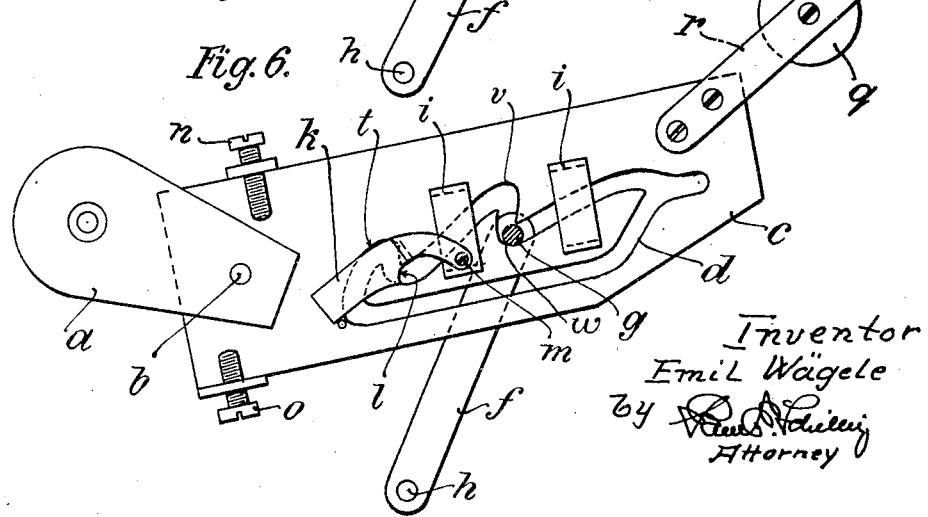

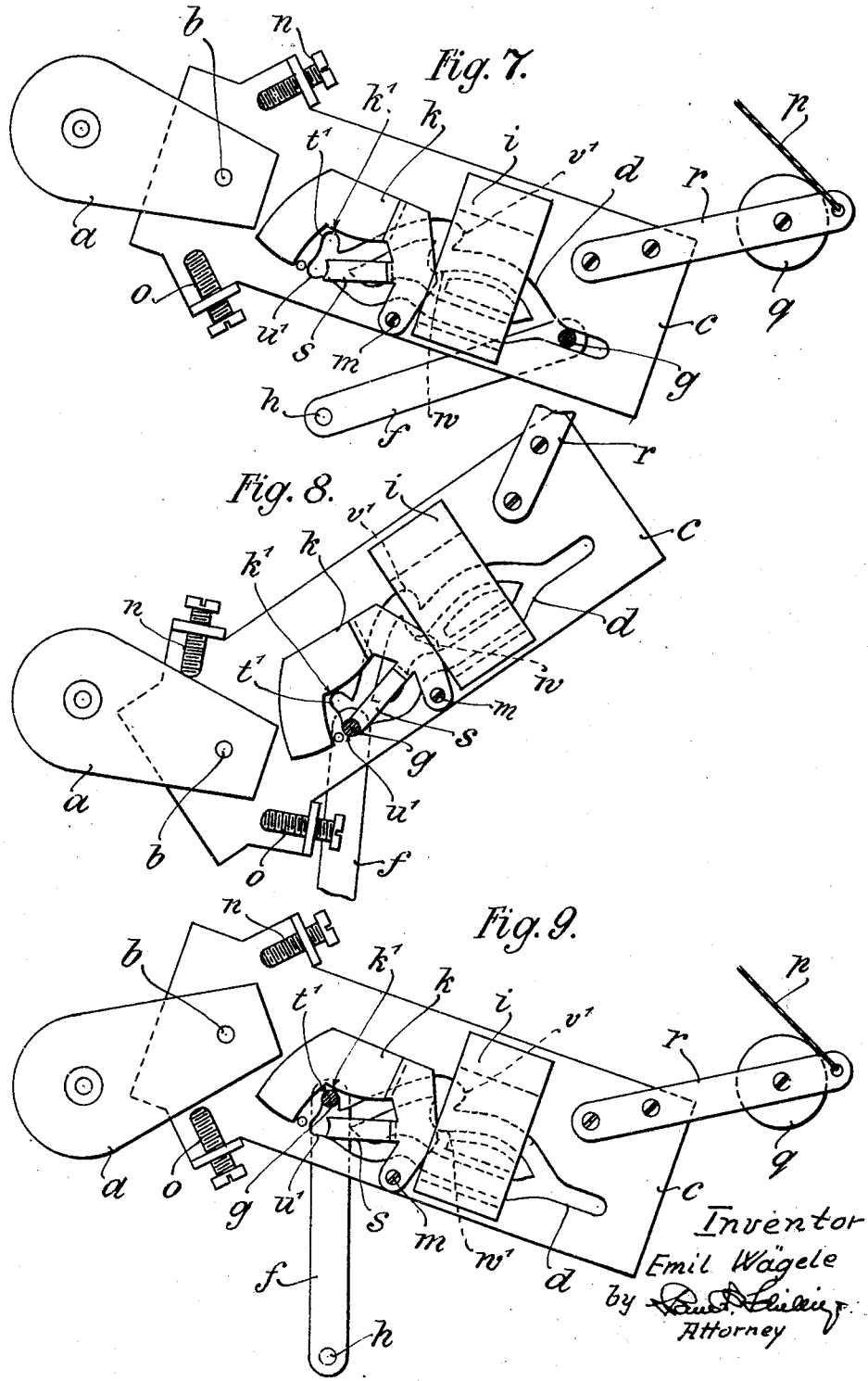

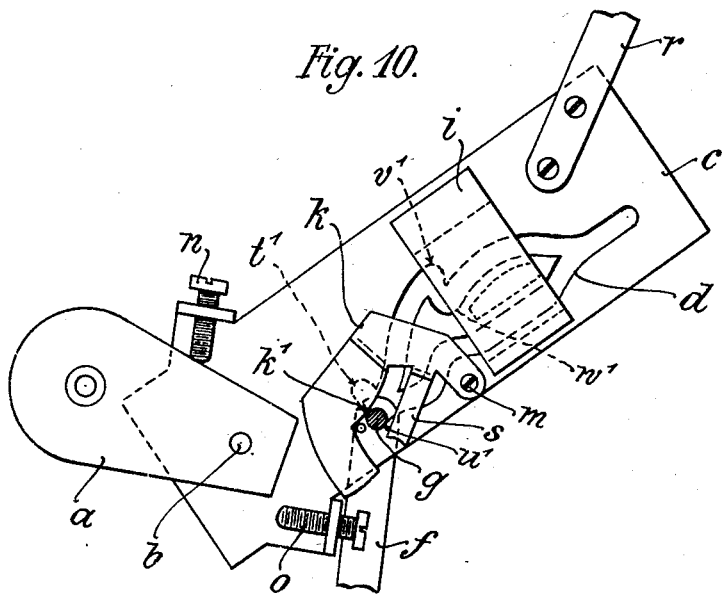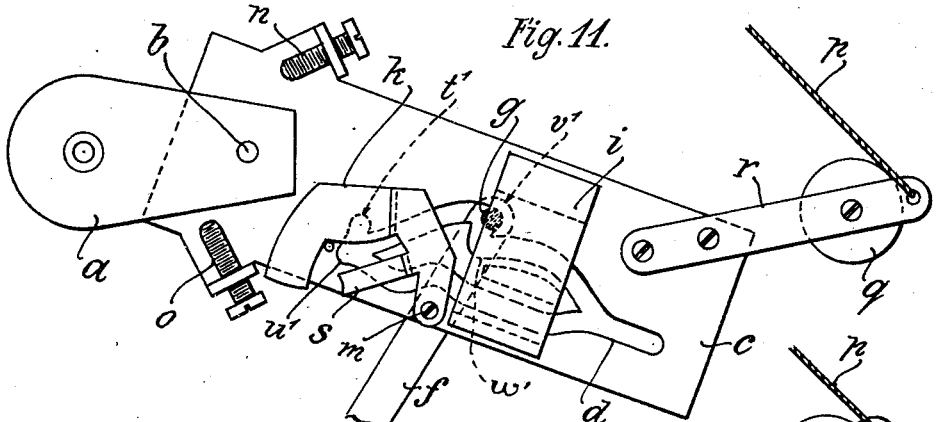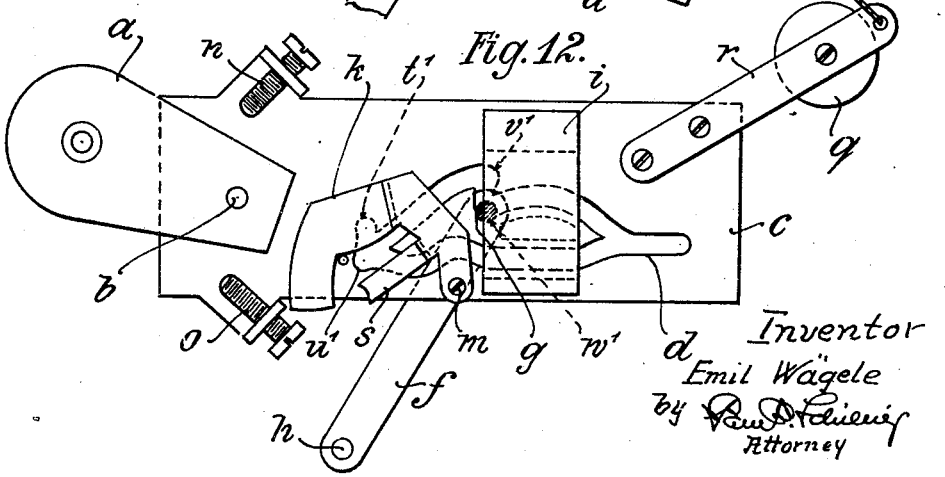

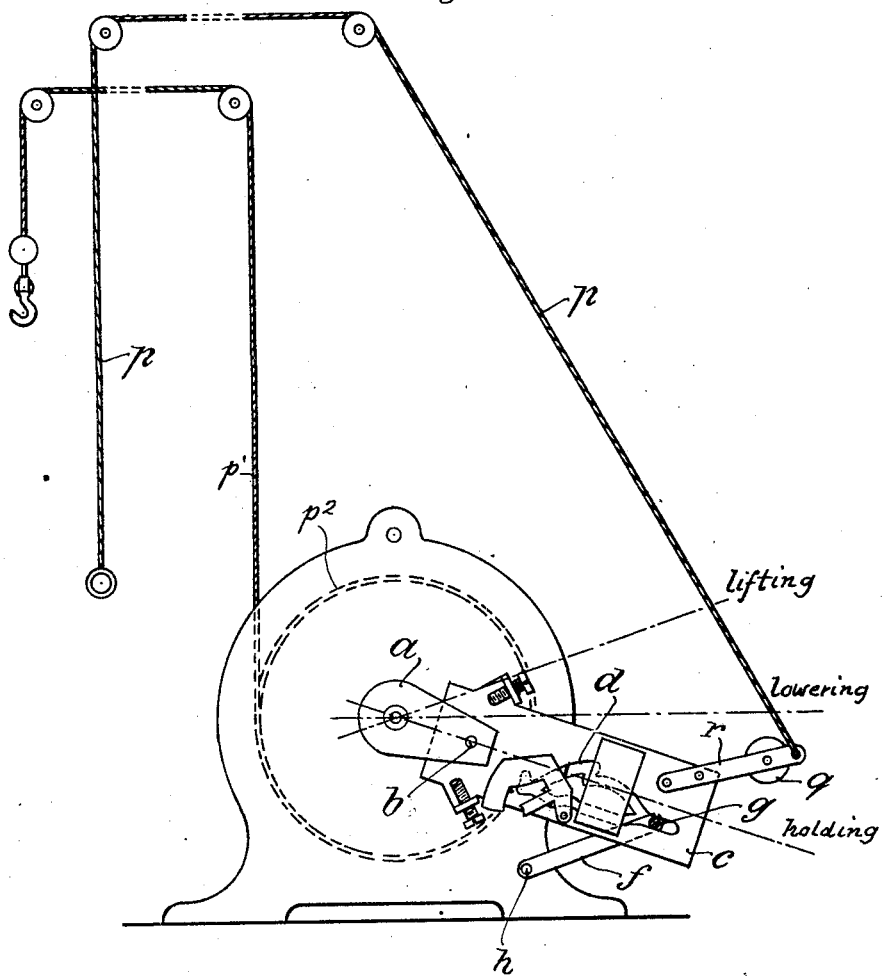

1,692,009

UNITED STATES PATENT OFFICE.

EMIL WÄGELE, OF SUMPFOHREN, NEAR DONAUESCHINGEN, GERMANY.

REMOTE CONTROL DEVICE FOR POWER WINCHES AND THE LIKE.

Application filed May 14, 1927, Serial No. 191,528, and in Germany May 20, 1926.

This invention relates to a remote-control device for power-winches and the like, with which the control-lever of the machine is acted upon by an operating-lever fulcrumed to it. According to my invention the operating-lever is furnished with a cam-track for the end of a supporting-lever which is journaled to a stationary part. By this arrangement the control-lever of the winch can be actuated for the different working-operations by means of a single control-rope, which has merely to be pulled and released. Skilled attendance is unnecessary, a full pull on the rope, whether abrupt, quick or slow, effecting the desired change or reversal in the working of the winch. The fact that operation does not depend upon the sense of touch of the attendant renders this remote-control device particularly suitable for hay-elevators and the like, for the service of which only unskilled labor is usually available.

Two forms of construction of the invention are illustrated in the accompanying drawings, in which Figs. 1–6 are elevations, showing the first constructional form of the device in various successive working positions, whilst Figs. 7–12 are like views depicting a modified constructional form in successive positions of working. Fig. 13 illustrates the application of the new device to an elevator for hay or the like.

Referring more particularly to the construction shown in Figs. 1–6, the control-lever $a$ of the power-winch has fulcrumed to it at $b$ the operating-lever $c$, which is furnished with a cam-groove $d$ adapted to receive the pin $g$ protruding from the end of the supporting-lever $f$. This latter may conveniently be journaled to the frame of the winch, or to a base-plate or other stationary part. Return of the pin $g$ into its preceding position is prevented by a latch or tumbler $k$ pivoted at $m$. $n$ and $o$ are set-screws for limiting the extent of motion of the lever $c$ relatively to the control-lever $a$. The device may be operated by means of a rope $p$, fastened, for instance, to an arm $r$ projecting from the lever $c$ and provided with a weight $q$. The connecting-members $i$, $i$ bridge the groove $d$ and retain in position the lever part isolated by the groove from the body of the lever.

The manner of operation of this form of the device is as follows:— In the normal position of rest, that is, the "stop" position, the control-lever $a$ and operating-lever $c$ occupy the positions shown in Fig. 1. The lever $c$ is here supported at its outer end by the lever $f$ and pin $g$, and by its weight depresses the control-lever $a$ into the position for "stop". In this position the weight $q$ reposes on a suitable rest (not shown in the drawings), for the purpose of relieving the points of support.

If now the rope $p$ is pulled, the lever $c$ and with it the pin $g$ will assume the position shown in Fig. 2. On release of the rope the lever $c$ will descend again, so that the pin $g$ will enter a pocket or catch $t$ of the groove $d$. Since in this position of the parts the point of support of the lever $c$ does not coincide with its center of gravity, the control-lever $a$ will be raised by the weight $q$, into the position for "hoist" (Fig. 3).

To lower the load the rope $p$ must again be drawn, whereupon the pin $g$ will enter the catch $u$, whilst the control-lever $a$ will be turned into the position for "stop" (Fig. 4). At the same time the tumbler $k$ will embrace the pin $g$ with its shoulder $l$ and thus prevent the pin from returning into the catch $t$, when the rope $p$ is released.

On the rope $p$ being released again the pin $g$ will slide into the catch $v$ owing to the descent of the lever $c$ (Fig. 5). By reason of the weight $q$ the lever $c$ will now turn on the pin $g$ until the set-screw $o$ presses against the control-lever $a$, whereupon the latter will likewise be elevated to a certain extent, the winch however being still in the position for "lower".

On again drawing the rope the pin $g$ will enter the catch $w$, while the control-lever $a$ will descend again, that is, will be brought into the position for "stop". On the rope being now released the lever $c$ will drop, while the pin $g$ will return to its initial position (Fig. 1).

In the modification shown in Figs. 7–12, the cam-groove is of a somewhat different form, and the tumbler $k$ is otherwise shaped and is provided with a finger $s$, having a concave end adapted to receive the pin $g$.

The manner of operation of this form of construction is as follows:— By a pull on the rope $p$ the lever $c$ is brought out of the normal rest, or "stop", position (Fig. 7), in which the weight $q$ rests upon a suitable support, into the position shown in Fig. 8, the control-lever $a$ remaining in its "stop" position, whilst the pin $g$ enters the catch $u^1$. In its passage the pin $g$ raises the finger $s$ of the tumbler $k$, and then allows it to drop by gravity, whereupon the concave end of the finger will embrace the pin (Fig. 8).

On release of the rope $p$ the lever $c$ will descend, whereupon the pin $g$, with cooperation of the finger $s$, will enter the catch $t^1$, whilst on further motion of the lever $c$ the control-lever $a$ will be forced upward into the position for "hoist" (Fig. 9). The tumbler $k$ now rests with its middle part $k^1$ upon the pin $g$.

On the rope $p$ being pulled anew, the pin $g$ will again enter the catch $u^1$, while the control-lever $a$ will be forced down into the "stop" position. On release of the rope $p$ the lever $c$ will drop and the pin $g$, under the influence of the tumbler $k$, will slide into the catch $v^1$, and the control-lever $a$ will be turned into the position for "lower" (Fig. 11). Owing to the action of the weight $q$ the lever $c$ will now turn on the pin $g$ until the set-screw $o$ bears against the control-lever $a$, whereupon the latter will likewise be raised somewhat, the winch however remaining in the position for "lower".

A renewed pull upon the rope $p$ will cause the pin $g$ to enter the catch $w^1$ and the lever $c$ will turn the control-lever $a$ into the "stop" position (Fig. 12). Upon release of the rope the pin $g$ will slide back into the position shown in Fig. 7, the control-lever $a$ remaining in its "stop" position.

It will thus be seen that with this invention only a single rope is requisite for controlling the winch, and that attendance is greatly simplified, inasmuch as on each reversal there is always the same automatically limited pull, followed by release. Thus wrong operation, due to too sharp a pull upon the rope, or to unduly slow, or too sudden, release of the latter, is rendered impossible. The fact that the rope can be simply released after each reversing operation has the advantage that the attendant at once has both hands free for his other work, so that it is not necessary to employ a man solely to serve the winch. It is also an advantage that at each change from one working operation to another the parts necessarily first assume the "stop" position, as in this manner undue wear and tear of the winch are avoided, and break downs, such as sometimes occur with winches if reversal takes place too suddenly, are altogether obviated.

Fig. 13 shows the application of the invention to a hay or like elevator in which the hoisting rope or cable $p'$ is associated with a winding drum $p^2$ and the control lever $a$ is mounted upon the shaft of the drum and the lever $f$ is pivoted to the drum frame, the positions of the operating lever $c$ for the holding, lowering and lifting actions being indicated by the dot and dash lines.

Having thus described my invention, I claim as new:—

1. In a power-winch or the like, in combination, a control-lever, and a remote-control device comprising an operating-lever fulcrumed to the control-lever and provided with a cam-track presenting catches, and having a pivotal tumbler controlling the track, and a lever journaled to a stationary part, which cooperates with the said track and supports the operating-lever.

2. In a power-winch or the like, in combination, a control-lever, and a remote-control device comprising an operating-lever fulcrumed to the control-lever and provided with a cam-groove presenting pockets, and having a pivotal tumbler controlling the groove, and a lever journaled to a stationary part, whose end engages in the said cam-groove and which supports the operating-lever.

3. In a power-winch or the like, in combination, a control-lever, and a remote-control device comprising an operating-lever fulcrumed to the control-lever and provided with a cam-track presenting catches, and having a pivotal tumbler furnished with a finger controlling the track, and a lever journaled to a stationary part, whose end cooperates with the said track and is engaged by the tumbler-finger and which supports the operating-lever.

4. In a power-winch or the like, in combination, a control-lever, and a remote-control device comprising an operating-lever fulcrumed to the control-lever and provided with a cam-track presenting catches, and having a pivotal tumbler controlling the track, means for regulating the extent of motion of the operating-lever relatively to the control-lever, and a lever journaled to a stationary part, which cooperates with the said track and supports the operating-lever.

5. In a power-winch or the like, in combination, a control-lever, and a remote-control device comprising a counter-weighted operating-lever fulcrumed to the control-lever and provided with a cam-track presenting catches, and having a pivotal tumbler controlling the track, means for regulating the extent of motion of the operating-lever relatively to the control-lever, a lever journaled to a stationary part, which cooperates with the said track and supports the operating-lever, and flexible means for actuating the operating-lever.

In testimony whereof I affix my signature.

EMIL WÄGELE.